(12) United States Patent
Kometani et al.

(10) Patent No.: US 11,735,970 B2
(45) Date of Patent: Aug. 22, 2023

(54) SHORT-CIRCUIT GENERATOR

(71) Applicant: Mitsubishi Electric Corporation, Tokyo (JP)

(72) Inventors: Haruyuki Kometani, Tokyo (JP); Ryoji Miyatake, Tokyo (JP); Naoyoshi Mori, Tokyo (JP); Yuta Saito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/620,984

(22) PCT Filed: Jul. 16, 2019

(86) PCT No.: PCT/JP2019/027896
§ 371 (c)(1),
(2) Date: Dec. 20, 2021

(87) PCT Pub. No.: WO2021/009837
PCT Pub. Date: Jan. 21, 2021

(65) Prior Publication Data
US 2022/0360127 A1    Nov. 10, 2022

(51) Int. Cl.
*H02K 3/487* (2006.01)
*H02K 3/16* (2006.01)

(52) U.S. Cl.
CPC ............... *H02K 3/16* (2013.01); *H02K 3/487* (2013.01)

(58) Field of Classification Search
CPC ...... H02K 3/16; H02K 3/487; H02K 2213/03; H02K 1/205
See application file for complete search history.

(56) References Cited

U.S. PATENT DOCUMENTS

| | | | | |
|---|---|---|---|---|
| 3,643,118 A | * | 2/1972 | Ichiki | H02K 23/42 310/179 |
| 5,122,698 A | * | 6/1992 | Walker | H02K 3/16 310/214 |

FOREIGN PATENT DOCUMENTS

| | | |
|---|---|---|
| CN | 103441606 A | 12/2013 |
| JP | H05103437 A | 4/1993 |
| JP | H08280148 A | 10/1996 |

OTHER PUBLICATIONS

International Search Report (PCT/ISA/210) with translation and Written Opinion (PCT/ISA/237) dated Sep. 24, 2019, by the Japan Patent Office as the International Searching Authority for International Application No. PCT/JP2019/027896. (6 pages).

(Continued)

*Primary Examiner* — Dang D Le
(74) *Attorney, Agent, or Firm* — Buchanan Ingersoll & Rooney PC

(57) ABSTRACT

A short-circuit generator is a generator in which stator slots provided with windings of a stator placed therein each have a depth in a radial direction perpendicular to a rotor central axis whose ratio divided by a width of the stator slot in a direction perpendicular both to the radial direction and a direction of the rotor central axis, is less than three. A rotor includes: a field winding placed in each of rotor slots; a metallic damper bar placed in each of the rotor slots on an outer periphery side of the field winding; and a metallic wedge placed in each of the rotor slots on an outer periphery side of the damper bar and connected to the damper bar. A damper-bar height that is a height of the damper bar is less than a wedge height that is a height of the wedge in the radial direction.

19 Claims, 13 Drawing Sheets

(56) References Cited

OTHER PUBLICATIONS

Fuji electric journal vol. 66 No. 2 1993, pp. 149-152.
Proceedings of 2013 IEEJ Power and Energy Division Conference, p. 41-19 and 41-20.
Office Action issued Chinese Application No. 201980098351.1; dated Jun. 30, 2023. 8 Pages.

* cited by examiner

SHORT-CIRCUIT GENERATOR

TECHNICAL FIELD

The present application relates to a short-circuit generator.

BACKGROUND ART

The short-circuit generator is an electric generator which provides, as its output, a current generated when armature windings are suddenly short-circuited. In Patent Document 1, for example, a functional summary of the short-circuit generator is described. The short-circuit generator is employed to execute a performance test and a full-scale short-circuit test of a switch protection apparatus or the like used in a power system. Since the short-circuit generator generates a large current in a short time, special consideration has been paid thereto. For example, there have been taken such measures of reducing the transient reactance of the armature windings as much as possible; and employing a winding structure which fully withstands an abnormally-large mechanical force caused by the large current.

Since the short-circuit generator is an electric generator for a special purpose such as an inspection or the like, its output power characteristics differ largely from those of a conventional synchronous generator (turbine generator). According to the conventional synchronous generator, armature windings are connected to a system and a rotor is rotated using external motive force, so that a voltage and current output is obtained in the armature winding. According to the short-circuit generator, armature windings are suddenly short-circuited to thereby obtain a large-current output. Thus, a method for the short-circuit generator to achieve improvement in the characteristics differs from a method for the conventional synchronous generator to achieve improvement in the characteristics.

CITATION LIST

Patent Document

Patent Document 1: Japanese Patent Application Laid-open No. H05-103437 (Paragraph 0002)

SUMMARY OF INVENTION

Problems to be Solved by Invention

The short-circuit generator is an electric generator which outputs a large instantaneous current that is generated in the armature winding when the armature windings stored in the slots of the stator are suddenly and externally short-circuited in a state where a voltage is being applied to a field winding stored in the plural slots of the rotor and the rotor is being rotated using external motive force. As a way to reduce the transient reactance of the armature windings, it is conceivable to make the stator-slot shape wider in its width direction and shallower in its depth direction, than that of the conventional synchronous generator. When the stator-slot shape that is wider in the width direction and shallower in the depth direction than that of the conventional synchronous generator, is applied to the short-circuit generator, because of the shallower stator slot, the slot leakage magnetic flux is reduced, thus creating an effect that the instantaneous output current increases.

As mentioned above, the smaller the initial transient reactance of the generator is designed, the larger the instantaneous output current of the generator becomes. Thus, there are cases where the short-circuit generator is so designed that a damper circuit of the rotor has a small resistance. Note that the damper circuit is a generic term of a circuit for flowing a current induced by the rotor, and is established by a massive iron core, wedges, damper bars, etc.

In the short-circuit generator, when the resistance of the rotor's damper circuit is made small, the output current up to 0.1 second later increases in a sudden short-circuit path under a condition in which the field voltage is not changed at the time of the sudden short-circuiting. However, under a condition in which, for the purpose of reducing attenuation of the output current (for increasing the current after the elapse of 0.1 second), the field voltage is abruptly increased simultaneously with the sudden short-circuiting, it has been found that, when the resistance of the rotor's damper circuit is made small, an effect of reducing attenuation of the output current is, conversely, not sufficiently achieved. Here, the method of abruptly increasing the field voltage simultaneously with the sudden short-circuiting, is referred to as Super Excitation (may be abbreviated as S.E.).

An object of a technique disclosed in the present description is to provide a short-circuit generator which can increase the output current sufficiently by applying Super Excitation at the time the armature windings are suddenly short-circuited, even if it is a short-circuit generator provided with a stator slot that is shaped to be wider in the width direction and shallower in the depth direction than that of the synchronous generator.

Means for Solving Problems

A short-circuit generator disclosed as an example in this description is a short-circuit generator which comprises a rotor and a stator located around an outer periphery of the rotor so as to enclose a rotor central axis thereof, said stator having stator slots in which windings are placed, and said stator slots each having a depth in a radial direction perpendicular to the rotor central axis whose ratio divided by a width of the stator slot in a direction perpendicular both to the radial direction and a direction of the rotor central axis, is less than three. The rotor comprises: a rotor core in which plural magnetic poles and plural rotor slots are formed; a field winding placed in each of the rotor slots; a metallic damper bar placed in each of the rotor slots on an outer periphery side of the field winding; and a metallic wedge placed in each of the rotor slots on an outer periphery side of the damper bar and connected to the damper bar. A damper-bar height that is a height of the damper bar in the radial direction is less than a wedge height that is a height of the wedge in the radial direction.

Effect of Invention

According to the short-circuit generator disclosed as an example in this description, since the damper-bar height that is a height of the damper bar in the radial direction is less than the wedge height that is a height of the wedge in the radial direction, it is possible to increase the output current sufficiently by applying Super Excitation at the time the armature windings are suddenly short-circuited.

MODES FOR CARRYING OUT INVENTION

Embodiment 1

Figure 1:
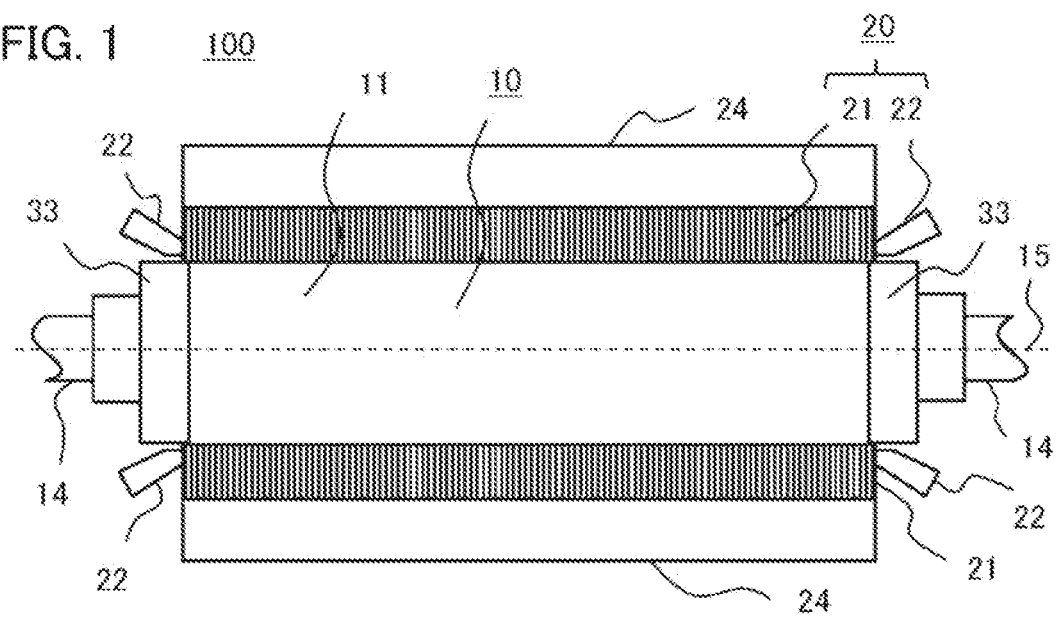
FIG. 1 is a diagram showing a short-circuit generator according to Embodiment 1.
Figure 2:
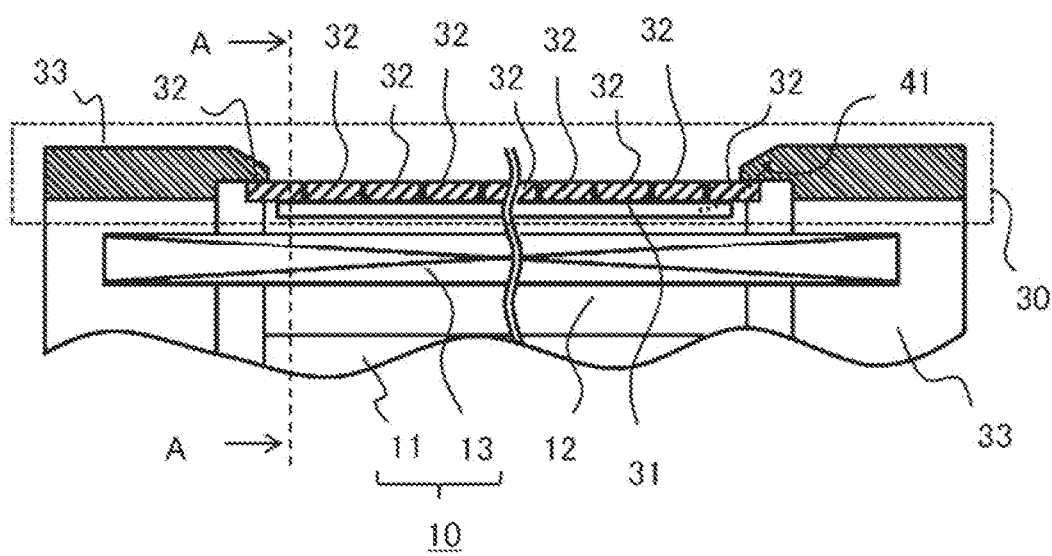
FIG. 2 is a diagram showing relevant parts of a rotor and a retaining ring in FIG. 1.
Figure 3:
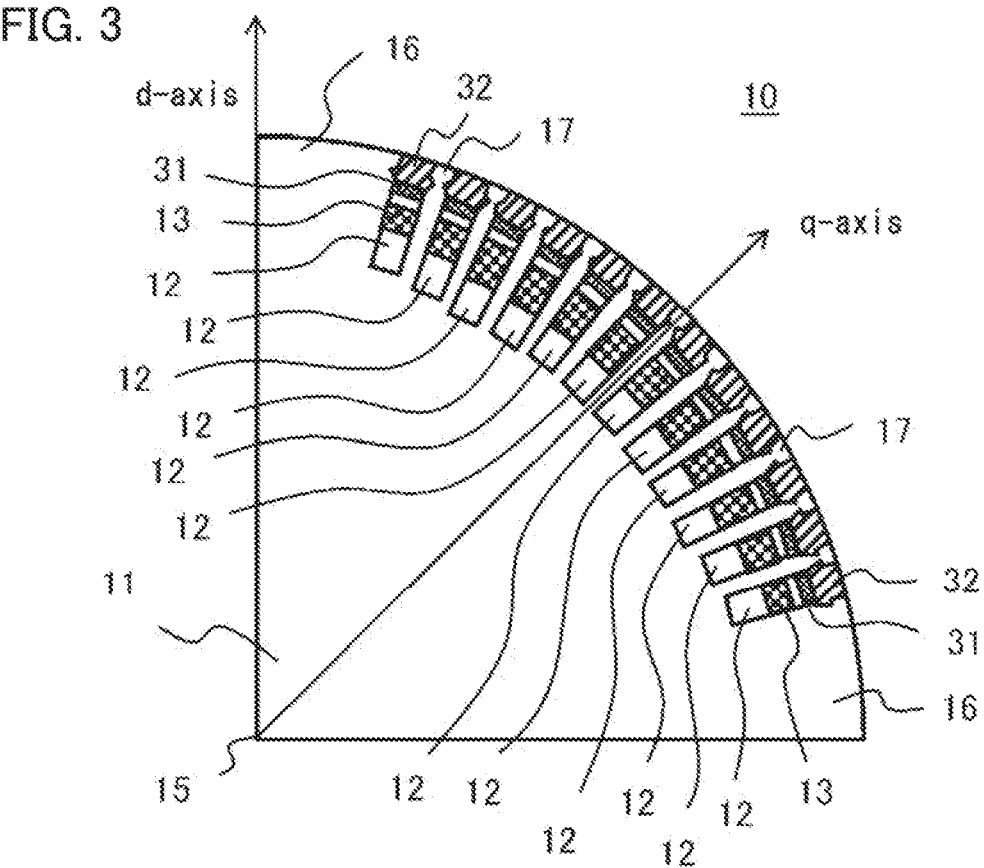
FIG. 3 is a sectional view along A-A in FIG. 2.
Figure 4:
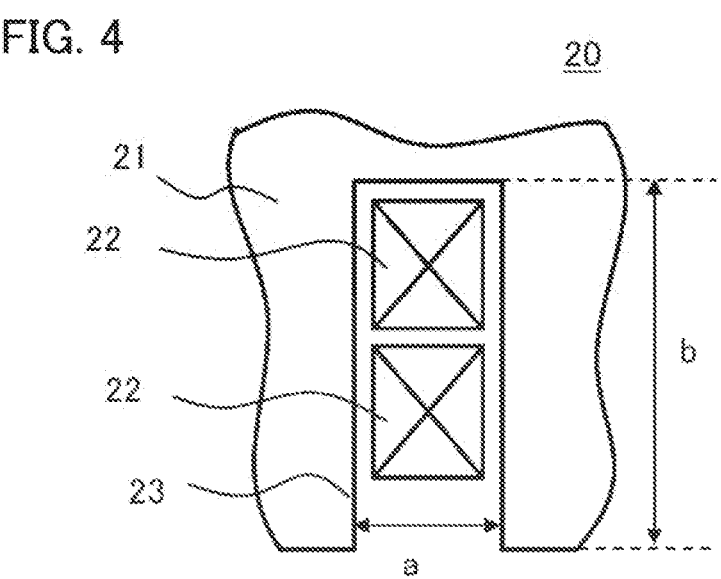
FIG. 4 is a diagram showing a relevant part of a stator in FIG. 1.
Figure 5:
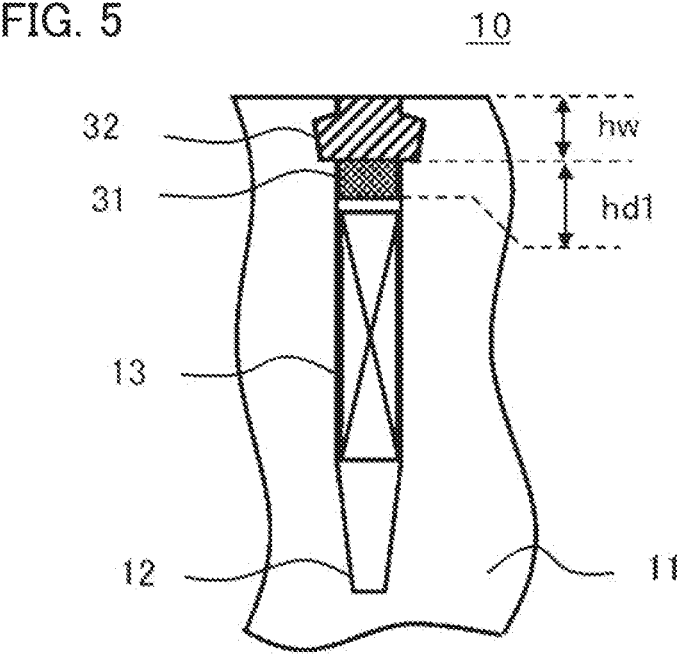
FIG. 5 is a diagram showing a rotor slot and a damper circuit in the short-circuit generator according to Embodiment 1.
Figure 6:
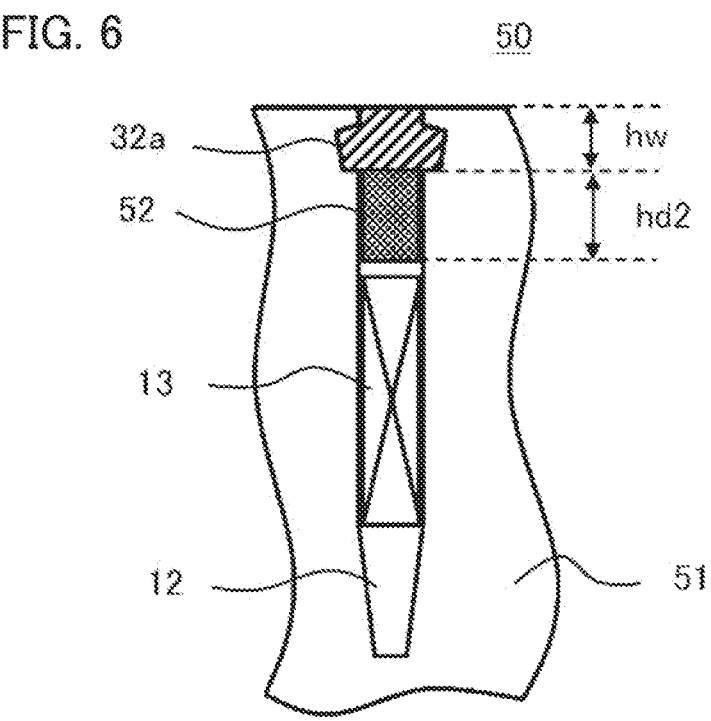
FIG. 6 is a diagram showing a rotor slot and a damper circuit in a short-circuit generator according to a comparison example.
Figure 7:
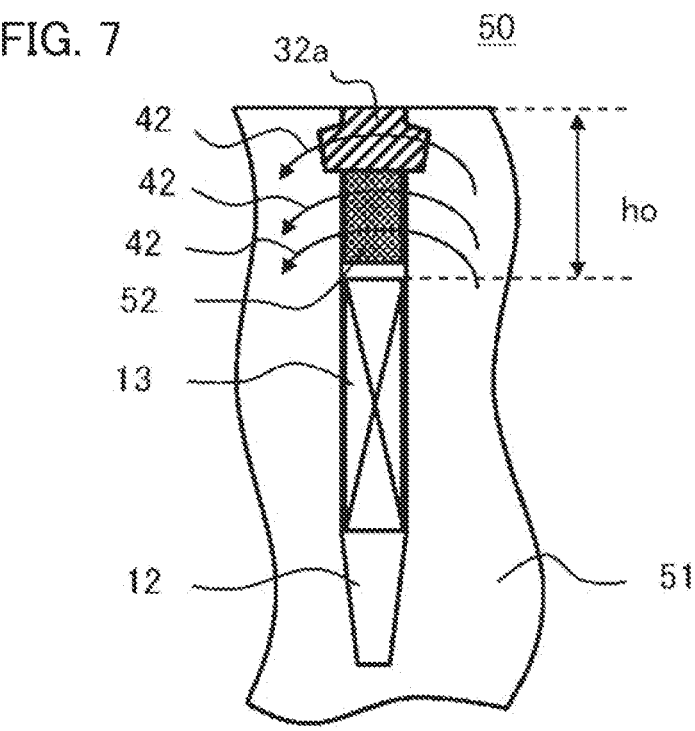
FIG. 7 is a diagram for illustrating a leakage magnetic flux.
Figure 8:
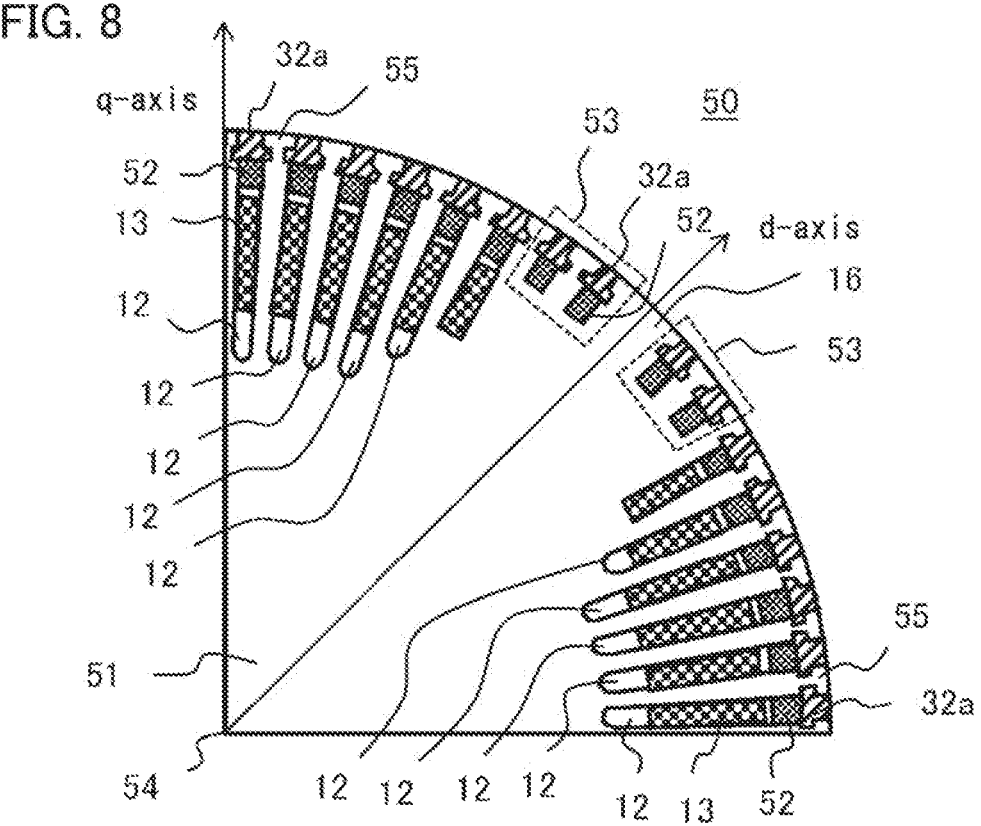
FIG. 8 is a sectional view of a rotor in the short-circuit generator according to the comparison example.
Figure 9:
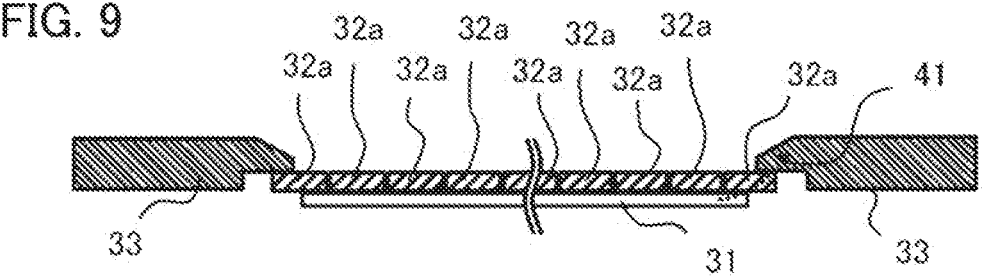
FIG. 9 is a diagram showing a wedge and a damper bar in Sample S2.
Figure 10:
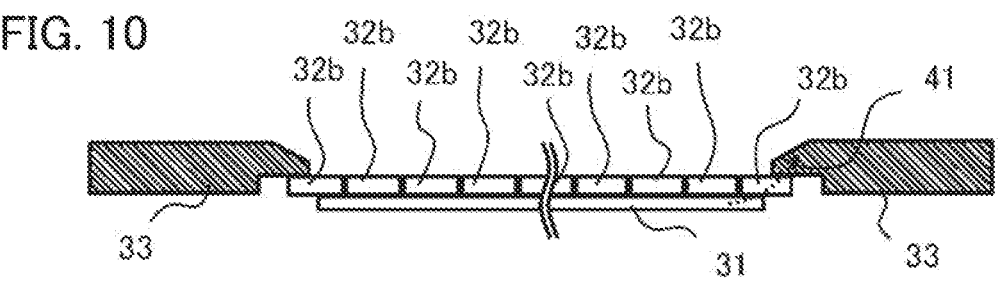
FIG. 10 is a diagram showing a wedge and a damper bar in Sample S3.
Figure 11:
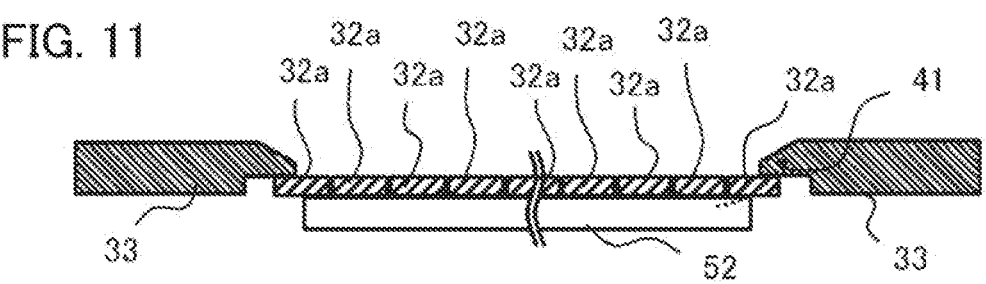
FIG. 11 is a diagram showing a wedge and a damper bar in Sample S1.
Figure 12:
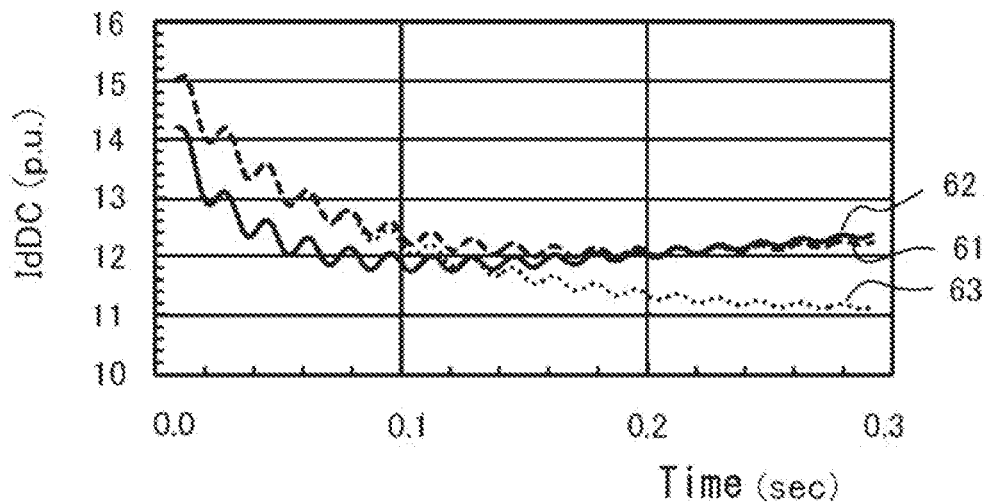
FIG. 12 is a graph showing simulation results of d-axis direct-current components in the output currents of the short-circuit generators according to Embodiment 1 and the comparison example.
Figure 13:
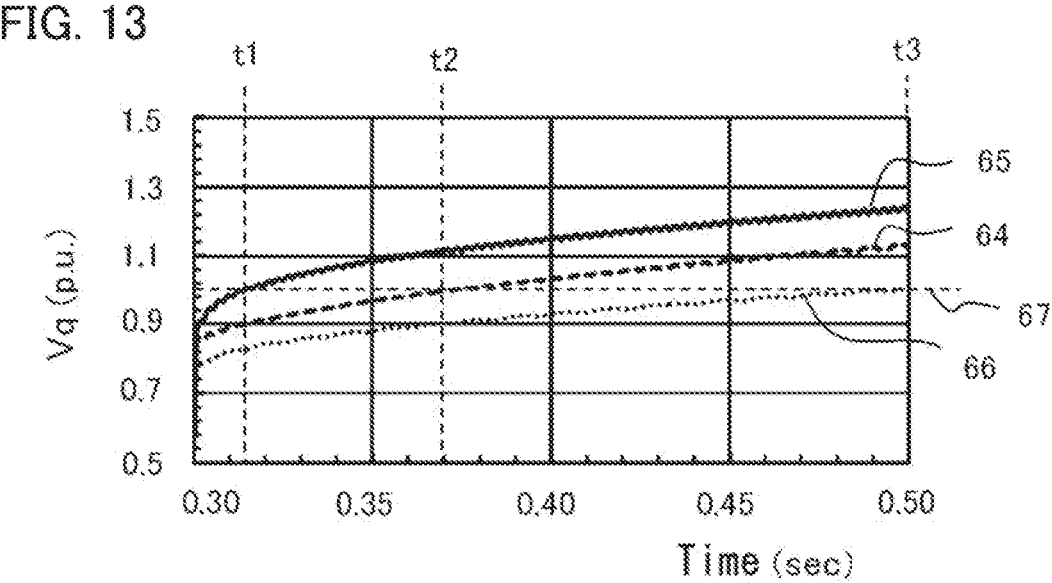
FIG. 13 is a graph showing simulation results of q-axis components in the output currents of the short-circuit generators according to Embodiment 1 and the comparison example.

A short-circuit generator 100 of Embodiment 1 will be described with reference to the drawings. For the same or equivalent configuration elements herein, the same reference numerals will be given, so that repetitive description thereof will be omitted as the case may be. Also in other Embodiments, for the same or equivalent configuration elements, the same reference numerals will be given, so that repetitive description thereof will be omitted as the case may be. FIG. 1 is a diagram showing the short-circuit generator according to Embodiment 1, and FIG. 2 is a diagram showing relevant parts of a rotor and a retaining ring in FIG. 1. FIG. 3 is a sectional view along A-A in FIG. 2, and FIG. 4 is a diagram showing a relevant part of a stator in FIG. 1. FIG. 5 is a diagram showing a rotor slot and a damper circuit in the short-circuit generator according to Embodiment 1. FIG. 6 is a diagram showing a rotor slot and a damper circuit in a short-circuit generator according to a comparison example, and FIG. 7 is a diagram for illustrating a leakage magnetic flux. FIG. 8 is a sectional view of a rotor in the short-circuit generator according to the comparison example. FIGS. 9 to 11 are diagrams showing wedges and damper bars in Samples S2, S3 and S1, respectively. FIG. 12 is a graph showing simulation results of d-axis direct-current components in the output currents of the short-circuit generators according to Embodiment 1 and the comparison example. FIG. 13 is a graph showing simulation results of q-axis components in the output currents of the short-circuit generators according to Embodiment 1 and the comparison example.

The short-circuit generator 100 includes: a rotor 10; a stator 20 located around the outer periphery of the rotor 10 so as to enclose rotor central axis 15; and a stator frame 24 that holds the stator 20. The rotor 10 includes: a rotor core 11 in which magnetic poles 16 and rotor slots 12 are formed; a rotor shaft 14 joined to the rotor core 11; a field coil (field winding) 13; damper bars 31; wedges 32; and retaining rings 33. The field coil 13, the damper bar 31 and the wedge 32 are placed in each of the rotor slots 12. The stator 20 includes: a stator core 21 in which magnetic poles (not shown) and stator slots 23 are formed; and stator coils (armature windings) 22 placed in the stator slots 23. The rotor core 11 is a massive iron core, and the rotor core 11 has the magnetic poles 16 and the rotor slots 12 formed in the massive iron core. The stator 20 is an armature that interacts with a magnetic field induced by the rotation of the rotor 10. The retaining rings 33 cover both end portions of the rotor core 11 in a direction of the rotor central axis 15, and both end portions of each of the wedges 32 in the direction of the rotor central axis 15, and are in contact with the end portions of the rotor core 11 in the direction of the rotor central axis 15 and the end portions of each of the wedges 32 in the direction of the rotor central axis 15. More specifically, the retaining rings 33 are in contact with the end portions of each of the wedges 32 in the direction of the rotor central axis 15, and in contact with the magnetic poles 16 and core projection portions 17 adjacent to the wedges 32 and between the rotor slots 12, at the end portions of the rotor core 11 in the direction of the rotor central axis 15. Note that, where appropriate, the stator coils 22 are denoted as the armature windings 22.

According to the short-circuit generator 100 of Embodiment 1, a slot width "a" and a slot depth "b" of each of the stator slots 23 have the relationship of a formula (1). The slot width "a" is a width of the stator slot 23 in a direction perpendicular both to the radial direction of the rotor 10 and the direction of the rotor central axis 15. The slot depth "b" is a depth of the stator slot 23 in a direction parallel to the radial direction of the rotor 10 and perpendicular to the rotor central axis 15.

$$b/a < 3 \tag{1}$$

The relationship of the formula (1) is an indicator distinguishable from a conventional synchronous generator.

A damper circuit 30 that is a circuit for flowing a current induced by the rotor 10 is established by the rotor core 11, the damper bars 31, the wedges 32 and the retaining rings 33. The smaller the initial transient reactance of the short-circuit generator is designed, the larger the instantaneous output current of the generator becomes. By making the electric resistance of the damper circuit 30 small, it is possible to make the initial transient reactance small, so that a large output current can be achieved at the time the stator coils 22 as armature windings are suddenly short-circuited. A rotor 50 having a damper circuit 30 whose electric resistance is made small, is shown in FIG. 6 to FIG. 8 and FIG. 11. The rotor 50 shown in FIG. 6 to FIG. 8 and FIG. 11 is a rotor of the comparison example.

First, the rotor 50 of the comparison example will be described. The rotor 50 includes: a rotor core 51 in which magnetic poles 16 and rotor slots 12 are formed; a field coil (field winding) 13; damper bars 52; wedges 32a; and retaining rings 33 (see, FIG. 11). The damper bar 52 made of a well-conductive metal material such as Cu or the like is placed on the radially outer side of the field coil 13, and on a radially further outer side thereof beyond the damper bar 52, the wedge 32a is provided in order to prevent the members in the slot, such as the damper bar 52 and the field coil 13, from flying out due to the centrifugal force. The wedge 32a is connected to the damper bar 51. Because the wedge 32a is required to be of a well-conductive metal, it is also made of a well-conductive metal such as BeCu, CrCu or the like.

As shown in FIG. 11, at the time the stator coils (armature windings) 22 are suddenly short-circuited, an induction current 41 flows in the damper bar 52, the wedge 32a and the retaining ring 33. The wedge 32a exists not only for flowing the induction current 41 and has a function serving as a strengthening member. As shown in FIG. 11, the wedge 32a has cut lines in the axial direction, so that the current flowing in the wedge 32a will be detoured, at the cut line in the axial direction, to the damper bar 52 and the like. Thus, in order to cause the induction current 41 to flow largely, the damper bar 52 is required to have a large cross-sectional area. The rotor 50 of the comparison example is configured so that a damper-bar height hd2 is larger than a wedge height hw. Namely, the rotor 50 of the comparison example is provided with the damper bars 52 and the wedges 32a having a relationship of hd2>hw. The damper-bar height hd2 and the wedge height hw are heights in the radial direction of the rotor 50.

In the short-circuit generator of the comparison example, in order to reduce attenuation of the short-circuit current, namely, to increase the short-circuit time constant, at the time of performing sudden short-circuiting without Super Excitation, pole damper portions 53 are provided partly in the magnetic pole 16 and the cross-sectional area of the damper bar 52 per one slot is made large to thereby decrease the resistance of the damper bar 52. As shown in FIG. 8, the pole damper portion 53 has a structure in which the damper bars 52 and the wedges 32a are placed in slots formed in the magnetic pole 16. In FIG. 8, a case is shown where, in the rotor slot 12 adjacent to the pole damper portion 53, on its side toward a rotor central axis 54, the field coil 13 is tightly placed with no gap. The retaining rings 33 (see, FIG. 11) cover the end portions of the rotor core 51 in its axial direction, and, at the end portions, they are in contact with the wedges 32a and core projection portions 55 between the respective adjacent rotor slots 12. In FIG. 8, a d-axis that passes from the rotor central axis 54 through the center of the magnetic pole 16, and a q-axis that passes from the rotor central axis 54 through the center between the magnetic poles 16, are shown.

Next, configurations of the rotor slot 12 and the damper circuit 30 according to the rotor 10 of Embodiment 1 will be described. In the rotor slot 12 of the rotor 10, on its side toward the rotor central axis 15, the field coil 13 is placed with an intervening gap. The damper bar 31 made of a well-conductive metal material such as Cu or the like is placed on the radially outer side of the field coil 13, and on a radially further outer side thereof beyond the damper bar 31, the wedge 32 is provided in order to prevent the members in the slot, such as the damper bar 31 and the field coil 13, from flying out due to the centrifugal force. The wedge 32 is connected to the damper bar 31. Because the wedge 32 is required to be of a well-conductive metal, it is also made of a well-conductive metal such as BeCu, CrCu, a stainless steel or the like. Here, the wedge 32 is formed of BeCu, CrCu or a stainless steel.

As shown in FIG. 2, at the time the stator coils (armature windings) 22 are suddenly short-circuited, the induction current 41 flows in the damper bar 31, the wedge 32 and the retaining ring 33. The wedge 32 exists not only for flowing the induction current 41 and has a function serving as a strengthening member. As shown in FIG. 2, the wedge 32 has cut lines in the axial direction, so that the current flowing in the wedge 32 will be detoured, at the cut line in the axial direction, to the damper bar 31 and the like. Namely, the wedge 32 is divided into plural portions, and the thus-divided wedge 32 is placed in the rotor slot 12 in the direction of the rotor central axis 15. According to the rotor 10 of Embodiment 1, unlike the comparison example, a damper-bar height hd1 is less than the wedge height hw. Namely, the rotor 10 of Embodiment 1 is provided with the damper bars 31 and the wedges 32 having a relationship of hd1<hw. The damper-bar height hd1 and the wedge height hw are heights in the radial direction of the rotor 10. According to the short-circuit generator 100 of Embodiment 1, since the rotor 10 is provided with the damper bars 31 and the wedges 32 having the relationship of hd1<hw, it is possible to increase the output current sufficiently when Super Excitation (abrupt increase in the field voltage) is applied. In the following, operations at the time of Super Excitation will be detailed.

When Super Excitation is simultaneously applied with the sudden short-circuiting of the stator coils (armature windings) 22, the magnetic flux induced from the field coil 13 increases abruptly. In response to the abruptly-changed magnetic flux, an induction current flows in the damper circuit 30 so as to cancel that magnetic flux. Accordingly, if the resistance of the damper circuit 30 is small, the induction current flows largely, so that the abruptly-increased field magnetic flux may not reach the stator coils (armature windings) 22 placed on the output side. In particular, according to the rotor 50 of the comparison example in which the resistance of the damper bar 52 is made small, the induction current in response to the abruptly-changed field magnetic flux increases, so that the effect of Super Excitation, namely, an output-current increasing effect due to abrupt increase in the field voltage, will be decreased. Although the effect of Super Excitation is an effect to be expected from the application of Super Excitation, according to the comparison example, such an effect is not achieved as expected and thus, the output current will not increase sufficiently.

In this respect, the rotor 10 of Embodiment 1 is provided with the damper bars 31 and the wedges 32 having the relationship of hd1<hw, so that it is possible to make the resistance of the damper bar 31 larger than that of the comparison example. This decreases the induction current due to abrupt increase in the field voltage, so that it is possible to achieve the effect of Super Excitation. Furthermore, according to the comparison example in which, as shown in FIG. 7, an in-slot outer-side length ho that is a radial length of an outer side portion of the slot, is long, the leakage magnetic flux 42 in the field magnetic flux becomes large, and this also decreases the magnetic flux that reaches the stator coils (armature windings) 22. For that reason, according to the rotor 10 of Embodiment 1, the relationship of hd1<hw is established, so that its in-slot outer-side length ho can be made shorter than that of the comparison example. Therefore, according to the rotor 10 of Embodiment 1, since the in-slot outer-side length ho can be made shorter than that of the comparison example, the magnetic flux that reaches the stator coils (armature windings) 22 increases, so that it becomes easier to achieve the effect of Super Excitation.

Shown in FIG. 12 are simulation results of d-axis direct-current components in the output currents, namely, direct-current components in d-axis currents Id, of the short-circuit generators according to Embodiment 1 and the comparison example. The abscissa represents time (sec) and the ordinate represents a d-axis direct-current component in the output current (direct-current component in the d-axis current Id) IdDC (p. u. (per unit)). FIG. 12 indicates each output current of the armature winding 22 in the case where, at a time 0.0, the armature windings 22 are suddenly short-circuited and the field voltage is subjected to Super Excitation up to eight times the voltage before short-circuiting. Note that the comparison about output current is made using the direct-current component in the d-axis current Id on which the effect of Super Excitation appears. A characteristic 63 is a characteristic of the short-circuit generator of the comparison example provided with the rotor 50, and characteristics 61, 62 are each a characteristic of the short-circuit generator 100 of Embodiment 1 provided with the rotor 10. The characteristics 61, 62 differ from each other in that they correspond to respective samples in which different materials are used for their respective wedges 32. In order to distinguish the difference between the materials, the reference numeral of the wedge 32 with which the characteristic 61 is exhibited is changed to 32a, and the reference numeral of the wedge 32 with which the characteristic 62 is exhibited is changed to 32b. The wedge 32a is of a metal such as BeCu, CrCu or the like, and the wedge 32b is of a metal that is lower in electric conductivity than the wedge 32a. For example, the wedge 32b is of a stainless steel or the like.

Shown in each of FIG. 9 to FIG. 11 is a portion including the wedge and the damper bar in each of the short-circuit generators of Samples S2, S3 and S1 that exhibit the characteristics 61, 62, 63 in FIG. 12, respectively. The short-circuit generator of Sample S2 (a short-circuit generator as a first example) is provided with the rotor 10 having the wedge 32a, and the short-circuit generator of Sample S3 (a short-circuit generator as a second example) is provided with the rotor 10 having the wedge 32b. The short-circuit generator of Sample S1 is a short-circuit generator as the comparison example which is provided with the rotor 50 having the wedge 32a. From FIG. 12, it can be seen that, after the elapse of 0.2 second from the sudden short-circuiting, the output current on each of the characteristics 61, 62 of the short-circuit generators 100 according to Embodiment 1, namely, the short-circuit generators 100 of Samples S2, S3, is larger than that on the characteristic 63, and thus the effect of Super Excitation appears.

The short-circuit generator of the comparison example provided with the rotor 50 includes the damper bars 52 and the wedges 32a having the relationship of hd2>hw, namely, it corresponds to a previously-described case where it is so designed that the damper circuit of the rotor has a small resistance. As shown in FIG. 12, the output-current increasing effect is not sufficiently achieved by the short-circuit generator of Sample S1 according to the comparison example, even when Super Excitation is applied. In contrast, unlike the short-circuit generator of the comparison example, the short-circuit generators 100 of Samples S2, S3 according to Embodiment 1 can increase the output current sufficiently by applying Super Excitation at the time the armature windings are suddenly short-circuited.

Shown in FIG. 13 are simulation results of how an output voltage (q-axis component in the armature voltage) varies when the armature windings 22 are disconnected after the elapse of 0.3 second from when the armature windings 22 are suddenly short-circuited. The abscissa represents time (sec) and the ordinate represents a q-axis component in the output voltage, that is, a q-axis voltage Vq (p. u.). Characteristics 64, 65 and 66 are characteristics of the short-circuit generators 100 of Samples S2, S3 according to Embodiment 1 and the short-circuit generator of Sample S1 according to the comparison example, respectively. A broken line 67 shown in FIG. 13 indicates a q-axis voltage Vq of 1.0 (p. u.) in the output voltage. With respect to the characteristic 66 of Sample S1 according to the comparison example, the time at which the q-axis voltage Vq in the output voltage reaches 1.0, is t3. However, with respect to the characteristics 64, 65 of Samples S2, S3 according to Embodiment 1, the times at which the q-axis voltage Vq in the output voltage reaches 1.0 are t1 and t2 that are earlier than t3. From FIG. 13, it can be seen that, with respect to the characteristics 64, 65 of Samples S2, S3 according to Embodiment 1, the interval of time until the voltage is recovered is shorter than that of the characteristic 66 of Sample S1 according to the comparison example.

The short-circuit generator of Sample S1 according to the comparison example has a problem that, with respect to a voltage generated due to voltage-drop phenomenon when the armature winding 22 are disconnected after the output current is increased by the sudden short-circuiting of the armature windings 22, the interval of time (recovery time) for the voltage to be recovered promptly up to a predetermined voltage (recovery voltage set value) becomes long. In contrast, unlike the short-circuit generator of the comparison example, the short-circuit generators 100 of Samples S2, S3 according to Embodiment 1 can reduce the interval of time for recovering the voltage generated at the time when the armature windings 22 are disconnected after the sudden short-circuiting of the armature windings 22, namely, the recovery time. Thus, the short-circuit generator 100 of Embodiment 1 can recover the voltage after the armature windings 22 are suddenly short-circuited, more promptly than the short-circuit generator of the comparison example. Note that in FIG. 13, a case is shown where the recovery voltage set value is 1.0 (p. u.).

It is noted that, in the case of the short-circuit generator 100 of Sample S3 according to Embodiment 1, namely, when the short-circuit generator is provided with the wedges 32b whose material is a stainless steel or the like, in order to increase the output voltage using Super Excitation, it is more effective to reduce the leakage magnetic flux 42 and to shorten the time constant, than to reduce the thickness of the damper bar 31. In the case of the short-circuit generator 100 of Sample S2 according to Embodiment 1, namely, when the short-circuit generator is provided with the wedges 32a whose material is BeCu, CrCu or the like that is higher in electric conductivity than that of the wedges 32b, in order to reduce a loss in the magnetic pole 16, it is effective to cause a current to flow in the wedge 32a, so that the damper bar 31 is expected only to exert an effect of detouring the current at the cut lines of the wedge 32a.

As described above, the short-circuit generator 100 of Embodiment 1 is a short-circuit generator which comprises the rotor 10 and the stator 20 located around an outer periphery of the rotor 10 so as to enclose the rotor central axis 15, said stator 20 having the stator slots 23 in which windings (stator coils 22) are placed, and said stator slots each having a depth (slot depth "b") in a radial direction perpendicular to the rotor central axis 15 whose ratio divided by a width (slot width "a") of the stator slot 23 in a direction perpendicular both to the radial direction and a direction of the rotor central axis 15, is less than three. The rotor 10 comprises: the rotor core 11 in which the plural magnetic poles 16 and the plural rotor slots 12 are formed; a field winding (field coil 13) placed in each of the rotor slots 12; the metallic damper bar 31 placed in each of the rotor slots 12 on an outer periphery side of the field winding (field coil 13); and the metallic wedge 32 placed in each of the rotor slots 12 on an outer periphery side of the damper bar 31 and connected to the damper bar 31. The damper-bar height hd1 that is a height of the damper bar 31 in the radial direction is less than the wedge height hw that is a height of the wedge 32 in the radial direction. Because of this configuration, since the damper-bar height hd1 that is a height of the damper bar 31 in the radial direction is less than the wedge height hw that is a height of the wedge 32 in the radial direction, the short-circuit generator 100 of Embodiment 1 can increase the output current sufficiently by applying Super Excitation at the time the armature windings are suddenly short-circuited.

Embodiment 2

Figure 14:
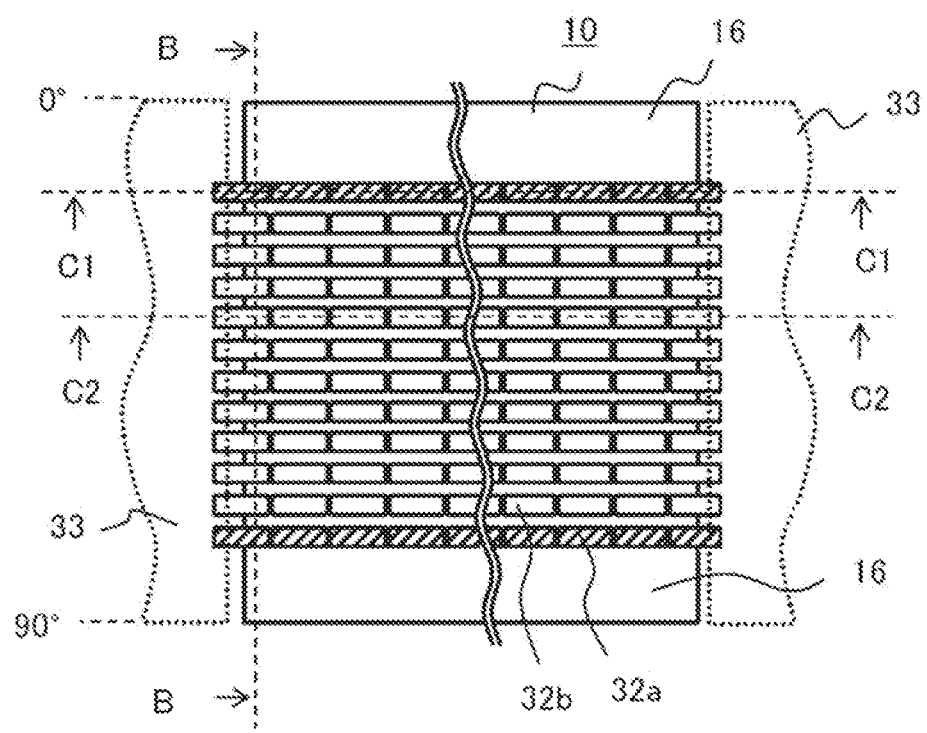
FIG. 14 is a diagram showing arrangement of wedges in a short-circuit generator according to Embodiment 2.
Figure 15:
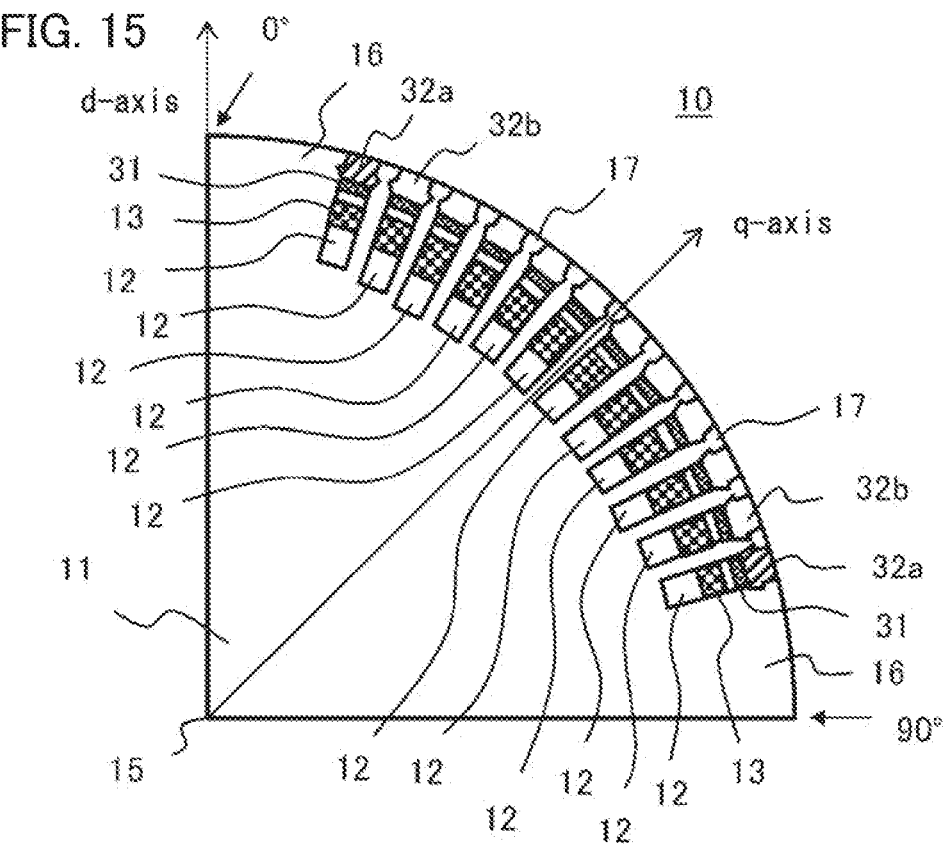
FIG. 15 is a sectional view along B-B in FIG. 14.
Figure 16:
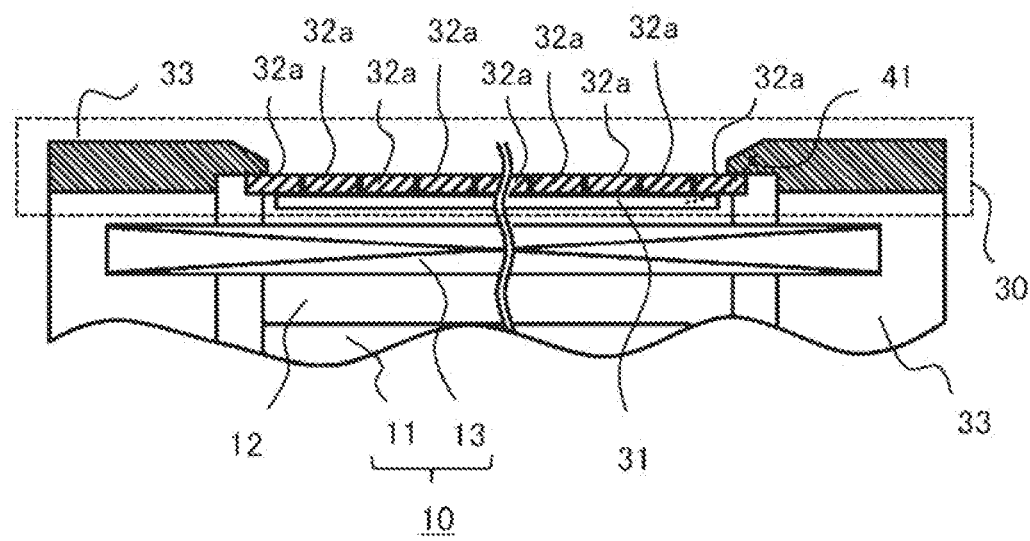
FIG. 16 is a sectional view along C1-C1 in FIG. 14.
Figure 17:
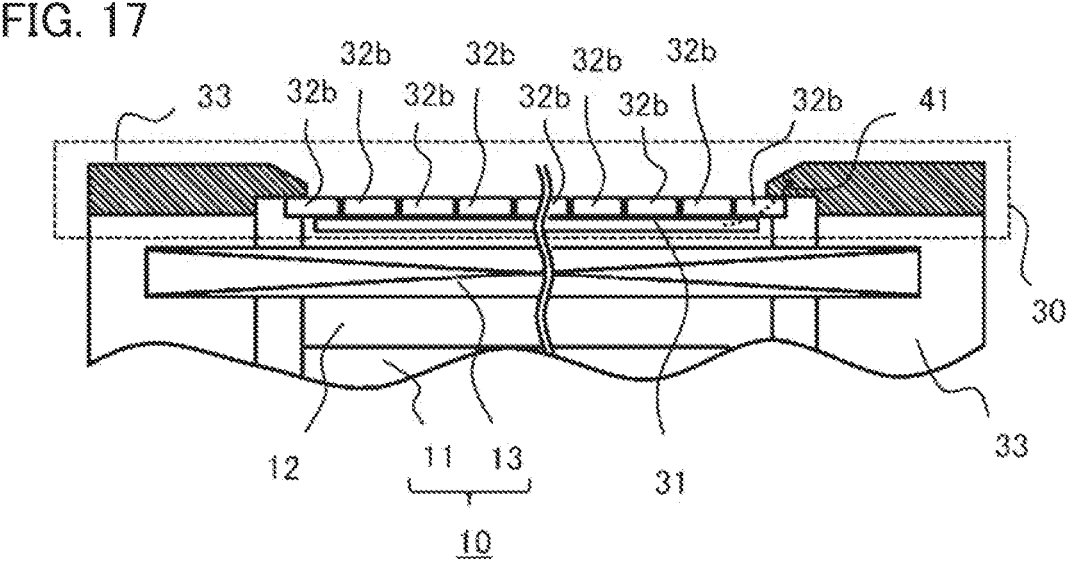
FIG. 17 is a sectional view along C2-C2 in FIG. 14.
Figure 18:
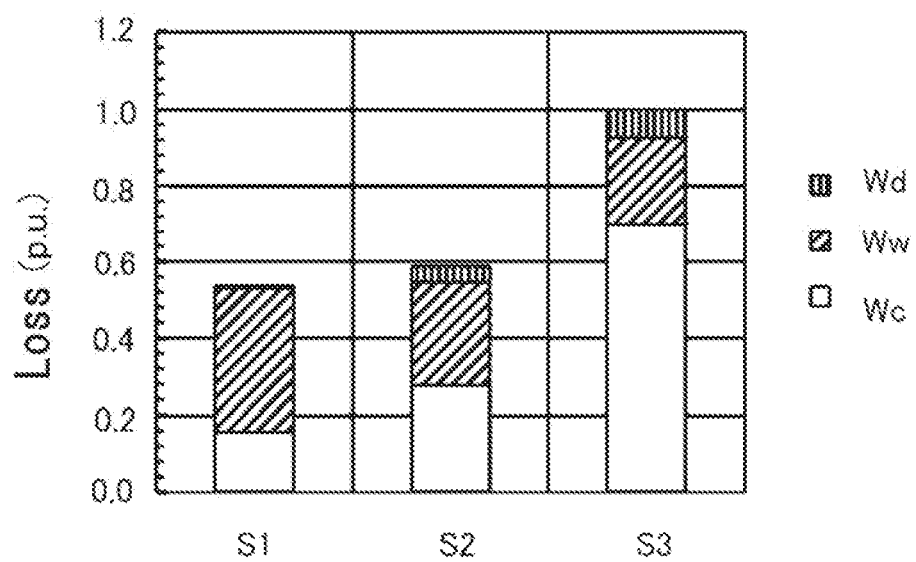
FIG. 18 is a diagram for explaining a problem with respect to the short-circuit generator according to Embodiment 2.
Figure 19:
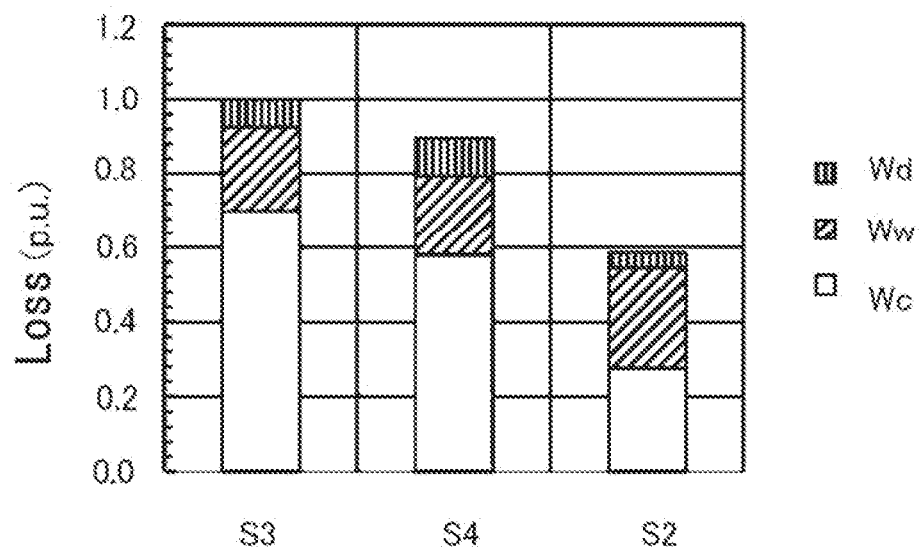
FIG. 19 is a diagram showing simulation results of average losses of the short-circuit generators according to Embodiment 2.

FIG. 14 is a diagram showing arrangement of wedges in a short-circuit generator according to Embodiment 2, and FIG. 15 is a sectional view along B-B in FIG. 14. FIG. 16 is a sectional view along C1-C1 in FIG. 14, and FIG. 17 is a sectional view along C2-C2 in FIG. 14. FIG. 18 is a diagram for explaining a problem with respect to the short-circuit generator according to Embodiment 2, and FIG. 19 is a diagram showing simulation results of average losses of the short-circuit generators according to Embodiment 2. Here, it has been described that, unlike the short-circuit generator of the comparison example, the short-circuit generator 100 of Embodiment 1 can increase the output current sufficiently by applying Super Excitation at the time the armature windings are suddenly short-circuited. According to the short-circuit generator in which Super Excitation is applied, even though instantaneously, the loss produced in the rotor becomes larger. Thus, when the loss produced in the rotor after the sudden short-circuiting of the armature windings is large, it may be assumed that the temperature of the wedge and the damper bar exceeds a temperature at which their high-temperature strengths are reduced. In Embodiment 2, a case will be described where the loss produced in the rotor after the sudden short-circuiting of the armature windings is made lower than that of the short-circuit generator of Embodiment 1.

A short-circuit generator 100 of Embodiment 2 differs from the short-circuit generator 100 of Embodiment 1 in that its rotor 10 has two types of wedges 32a, 32b with different materials. Description will be made mainly on differences from the short-circuit generator 100 of Embodiment 1. FIG. 14 is a diagram in which a quarter of the outermost periphery of the rotor 10 is expressed on a two-dimensional surface, namely, a portion of the outermost periphery of the rotor 10 extending from 0° to 90° is expressed on a two-dimensional surface. Note that in FIG. 14, the retaining rings 33 are shown by broken lines. The rotor 10 of the short-circuit generator 100 of Embodiment 2 includes: rotor slots 12 in which the wedges 32a of a first material are placed; and rotor slots 12 in which the wedges 32b of a second material are placed that is lower in electric conductivity than the first material. In the short-circuit generator 100 of Embodiment 2, the material (first material) of the wedges 32a used in the rotor slots 12 adjacent to the respective magnetic poles 16, is higher in electric conductivity than the material (second material) of the wedges 32b used in the rotor slots 12 other than those adjacent to the magnetic poles 16. In FIG. 14 and FIG. 15, a case is shown where the rotor slots 12 in which the wedges 32a of the first material are placed, are located nearest to the respective magnetic poles 16 of the rotor core 11. The electric conductivity of the wedges 32a of the first material is, for example, $30 \times 10^6$ [S/m], and the electric conductivity of the wedges 32b of the second material is, for example, $1.5 \times 10^6$ [S/m]. As already described in Embodiment 1, the material of the wedges 32a is, for example, BeCu, CrCu or the like. The material of the wedges 32b is, for example, a stainless steel or the like.

Using FIG. 18, a problem with respect to the short-circuit generator according to Embodiment 2 will be described. In FIG. 18, simulation results of average losses of some short-circuit generators are shown. The ordinate represents an average value of losses produced in the rotor during one cycle after the short-circuiting, namely, an average loss (p. u.). A symbol S1 on the left side means Sample S1 of the comparison example described in Embodiment 1, and symbols S2 and S3 at the center and on the right side, mean Samples S2 and S3 described in Embodiment 1, respectively. Note that a symbol We denotes the loss in the massive iron core, namely, in the rotor core 51 or the rotor core 11 (core loss); a symbol Ww denotes the loss in the wedges (wedge loss); and a symbol Wd denotes the loss in the damper bars (damper bar loss). Sample S1 is the short-circuit generator of the comparison example; Sample S2 is the short-circuit generator 100 of Embodiment 1 whose wedges are all the wedges 32a; and Sample S3 is the short-circuit generator 100 of Embodiment 1 whose wedges are all the wedges 32b.

As already described in Embodiment 1, Samples S2, S3 are equivalent in terms of the output-current increasing effect due to Super Excitation. Meanwhile, with respect to the recovery time for the voltage after the sudden short-circuiting of the armature windings 22 to be recovered up to the predetermined set value (recovery voltage set value) or more, it is shorter in Sample S3 than that in Sample S2. Accordingly, when it is desired to shorten the recovery time, Sample S3 is more preferable than the other. However, as can be seen from FIG. 18, according to Sample S3, the average loss in the rotor during one cycle after the short-circuiting is larger than that of Sample S2. Thus, when it is not desired to make the average loss large, Sample S2 is more preferable than the other. Note that, from FIG. 18, it can be seen that the short-circuit generators 100 of Samples S2, S3 according to Embodiment 1 have the average losses in the rotors that are larger than that of the short-circuit generator of Sample S1 according to the comparison example. Accordingly, such a case may arise that the short-circuit generator 100 is desired to shorten the recovery time as much as possible and to reduce the average loss in the rotor as much as possible.

The short-circuit generator 100 of Embodiment 2 is an exemplary short-circuit generator which, unlike the short-circuit generator of the comparison example, can increase the output current sufficiently by applying Super Excitation at the time the armature windings are suddenly short-circuited, and further, in which the recovery time is shortened as much as possible and the average loss in the rotor is reduced as much as possible. In FIG. 19, the average loss (p. u.) of the short-circuit generator 100 of Sample S4 according to Embodiment 2 is shown together with the average losses of the short-circuit generators 100 of Sample S2, S3 according to Embodiment 1. The ordinate represents an average value of losses produced in the rotor during one cycle after the short-circuiting, namely, an average loss (p. u.). From FIG. 19, it can be seen that, when two types of materials different in electric conductivity are used for the wedges of the rotor 10, the average loss in the rotor 10 is reduced. In particular, it can be seen that the core loss We in the average loss of Sample S4 is smaller than that in the average loss of Sample S3. Accordingly, the short-circuit generator 100 of Embodiment 2 can reduce the average loss in the rotor 10 while ensuring the output increasing effect due to Super Excitation. Further, it can also be said that the short-circuit generator 100 of Embodiment 2 can reduce the core loss We in the rotor 10 while ensuring the output increasing effect due to Super Excitation.

Further, since the difference between the short-circuit generator 100 of Embodiment 1 and the short-circuit generator 100 of Embodiment 2 resides in use of the two types of materials for the wedges of the rotor 10, it is clear that the output current (direct-current component in the d-axis current) after the elapse of 0.2 second from the short-circuiting of the short-circuit generator 100 of Embodiment 2, will exhibit a characteristic that falls in between the characteristic 61 and the characteristic 62 in FIG. 12, so that the output current will be prevented from being degraded. Accordingly, like the short-circuit generator 100 of Embodiment 1 and unlike the short-circuit generator of the comparison example, the short-circuit generator 100 of Embodiment 2 can increase the output current sufficiently by applying Super Excitation at the time the armature windings are suddenly short-circuited.

Furthermore, it is also clear that a changing characteristic of the output voltage (q-axis voltage in the armature voltage) which shows an effect about the recovery time according to the short-circuit generator 100 of Embodiment 2, will fall in between the characteristic 64 and the characteristic 65 in FIG. 13. Namely, according to the short-circuit generator 100 of Embodiment 2, the recovery time is shorter than that of the short-circuit generator of the comparison example, and thus the characteristic is improved as compared with the short-circuit generator of the comparison example.

It is noted that, in FIG. 14 and FIG. 15, a case has been shown where such a rotor 10 is provided in which, for every quarter of the rotor 10, the wedges 32a are placed only in two rotor slots 12 adjacent to the respective magnetic poles 16; however, this case is not limitative. Namely, the wedge 32a may be located in any region between the magnetic poles 16. Even in that case, it is clear that the output current (direct-current component in the d-axis current) after the elapse of 0.2 second from the short-circuiting of the short-circuit generator 100 of Embodiment 2, will exhibit a characteristic that falls in between the characteristic 61 and the characteristic 62 in FIG. 12, and it is also clear that the changing characteristic of the output voltage (q-axis voltage in the armature voltage) which shows an effect about the recovery time according to the short-circuit generator 100 of Embodiment 2, will fall in between the characteristic 64 and the characteristic 65 in FIG. 13. Further, it is clear that the average loss of the short-circuit generator 100 of Embodiment 2 will fall in between the average loss of Sample S3 and the average loss of Sample S2 in FIG. 19.

Further, the description has been made about a case where, in the quarter of the rotor 10, there are two first wedge rows that are the wedges 32a arranged in rows in a direction parallel to the rotor central axis 15 in the rotor shaft 14 of the rotor 10; however, the number of the first wedge rows may be three or more. Even in that case, unlike the short-circuit generator of the comparison example, the short-circuit generator 100 of Embodiment 2 can increase the output current sufficiently by applying Super Excitation at the time the armature windings are suddenly short-circuited, and can shorten the recovery time as much as possible and reduce the average loss in the rotor as much as possible. According to the short-circuit generator 100 of Embodiment 2, as the number of the first wedge rows increases, the characteristic of the output current (direct-current component in the d-axis current) after the elapse of 0.2 second from the short-circuiting becomes closer to the characteristic 61 in FIG. 12; the changing characteristic of the output voltage (q-axis voltage in the armature voltage) becomes closer to the characteristic 64 in FIG. 13; and the average loss becomes closer to the average loss of Sample S2 in FIG. 19.

Embodiment 3

Figure 20:
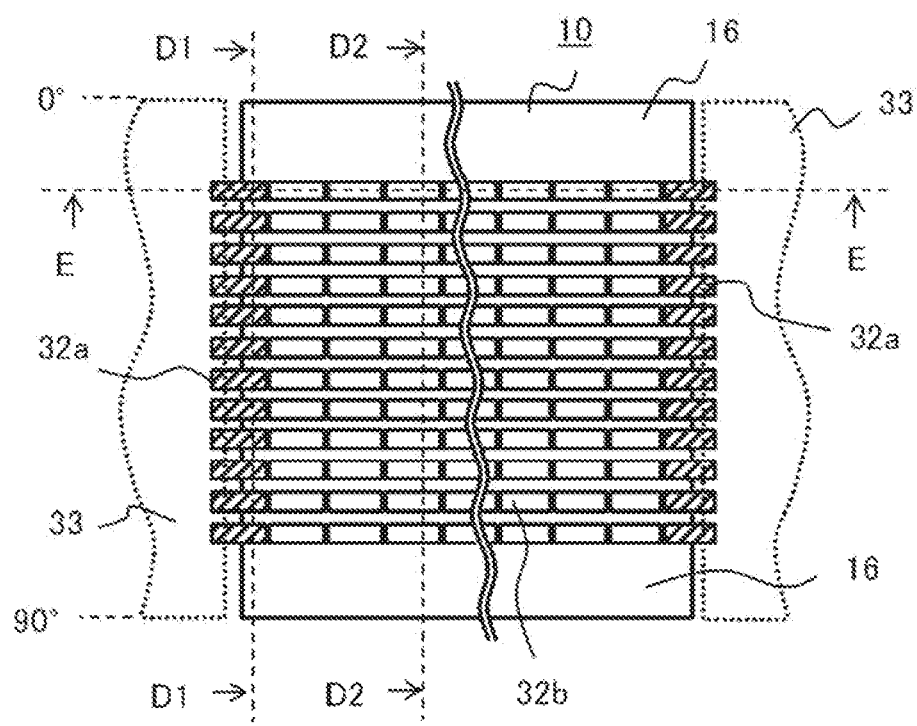
FIG. 20 is a diagram showing a first example of arrangement of wedges in a short-circuit generator according to Embodiment 3.
Figure 21:
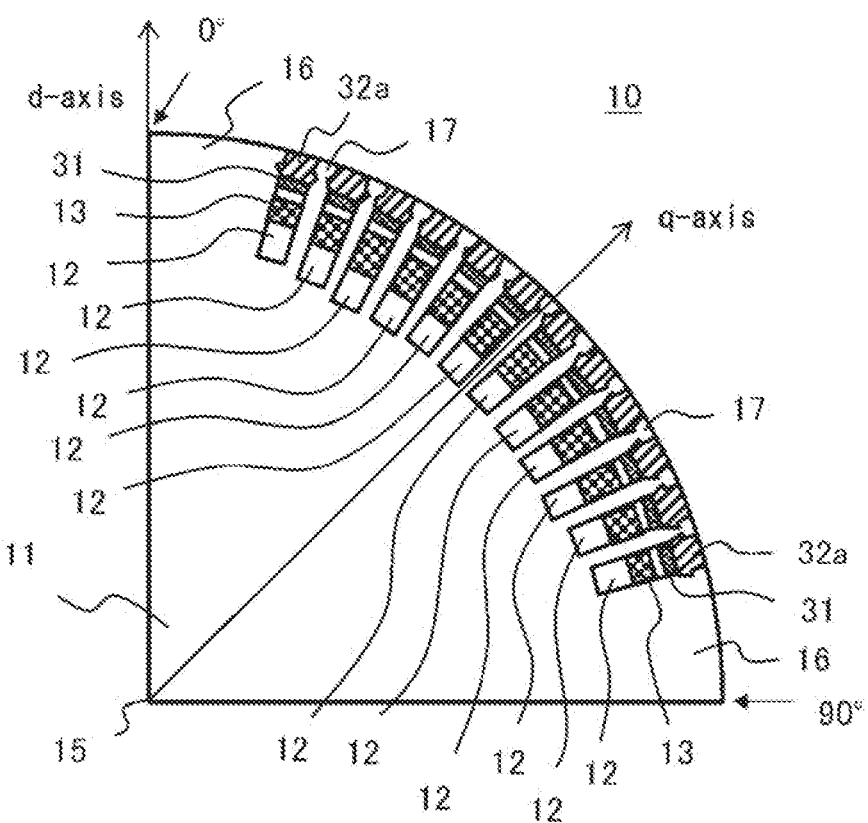
FIG. 21 is a sectional view along D1-D1 in FIG. 20.
Figure 22:
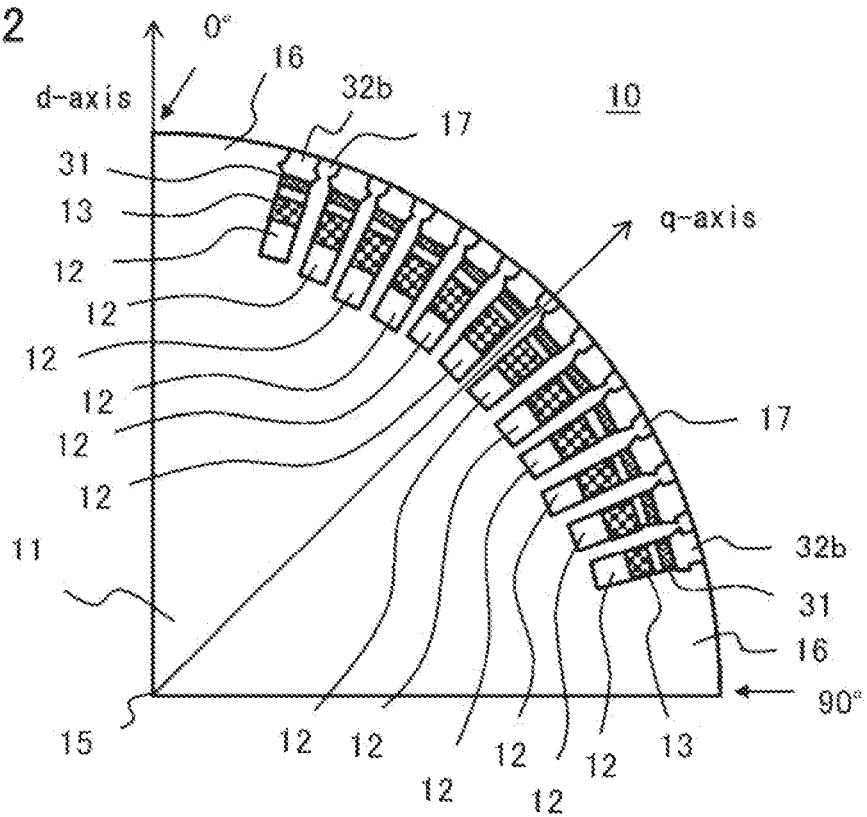
FIG. 22 is a sectional view along D2-D2 in FIG. 20.
Figure 23:
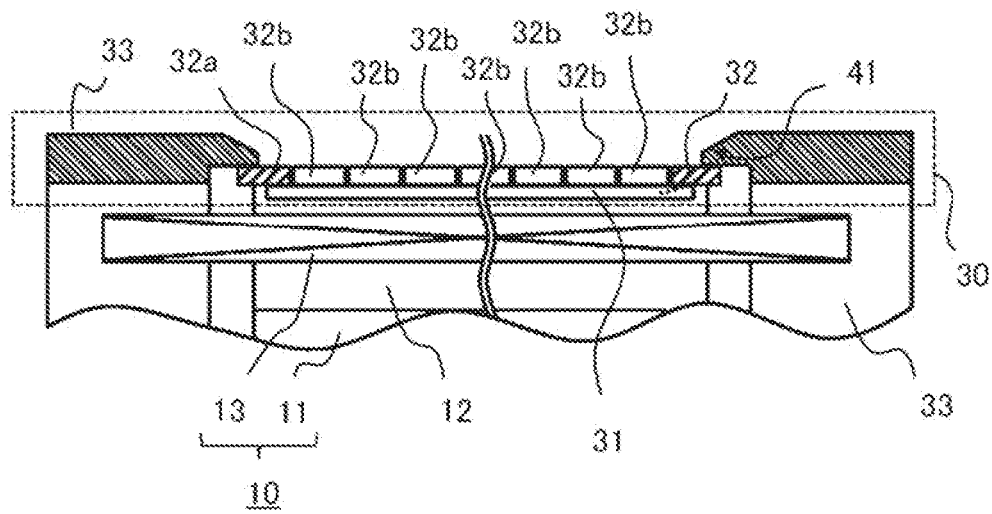
FIG. 23 is a sectional view along E-E in FIG. 20.
Figure 24:
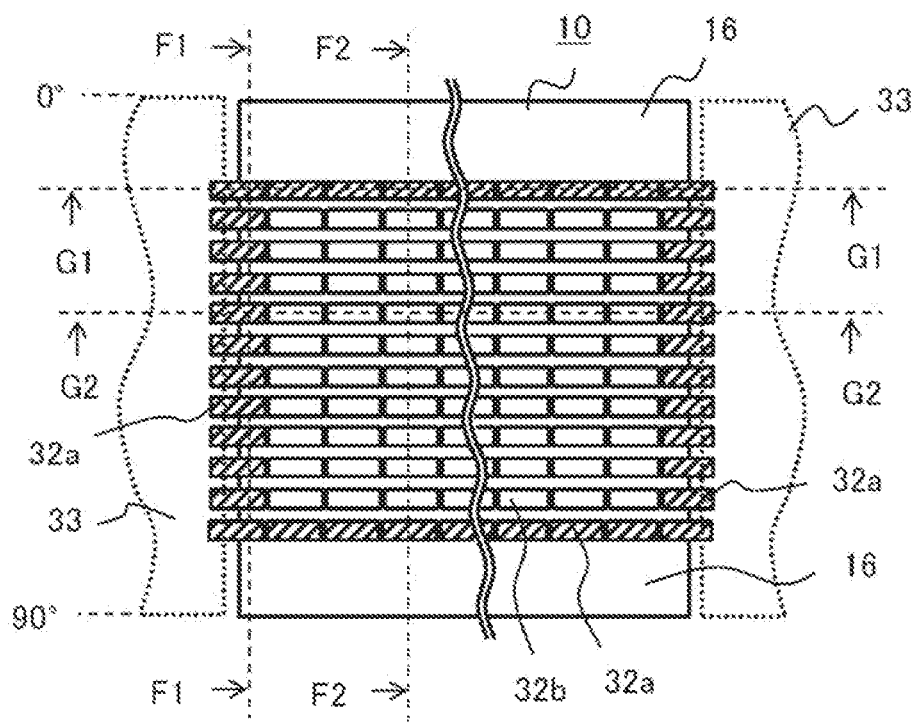
FIG. 24 is a diagram showing a second example of arrangement of wedges in a short-circuit generator according to Embodiment 3.
Figure 25:
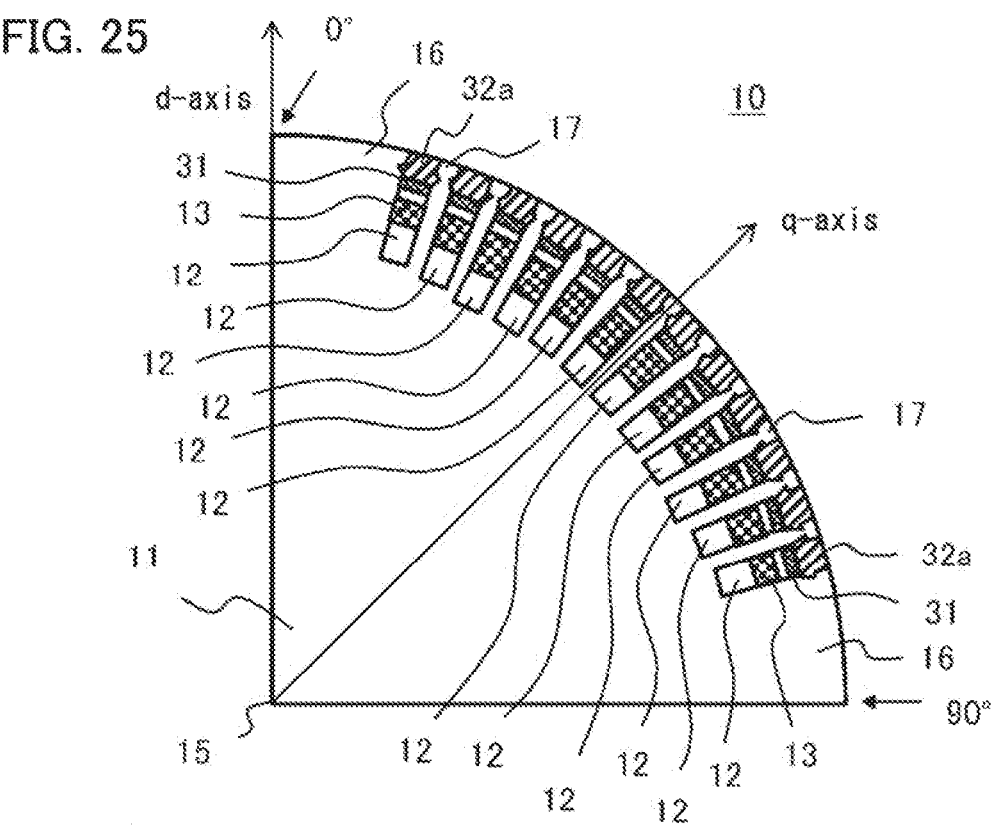
FIG. 25 is a sectional view along F1-F1 in FIG. 24.
Figure 26:
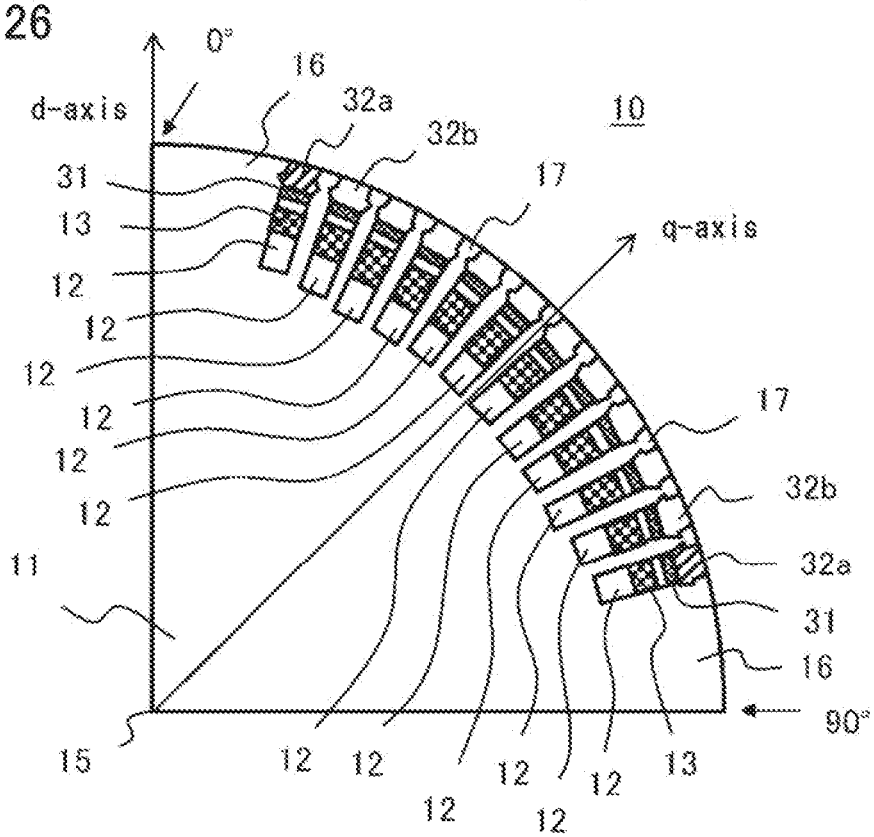
FIG. 26 is a sectional view along F2-F2 in FIG. 24.
Figure 27:
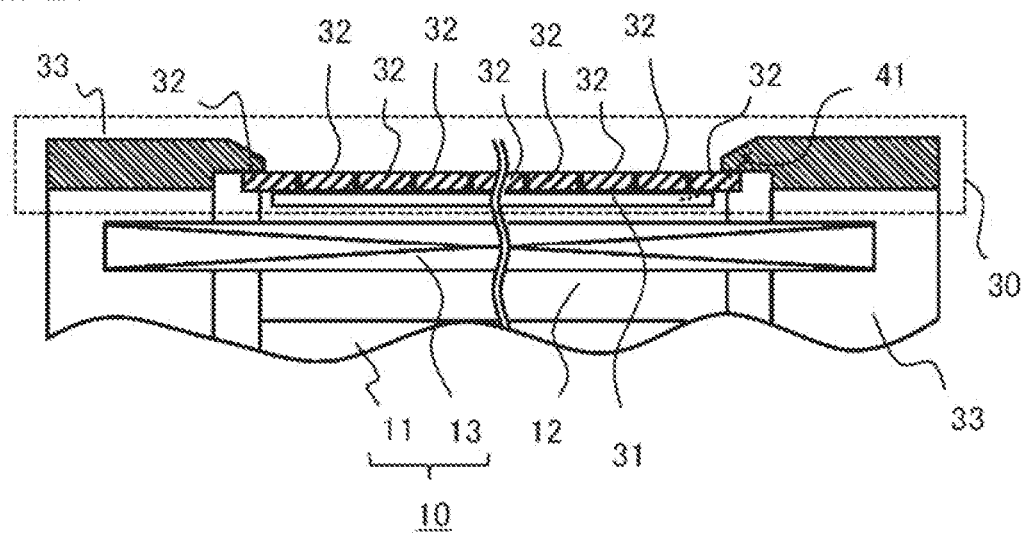
FIG. 27 is a sectional view along G1-G1 in FIG. 24.
Figure 28:
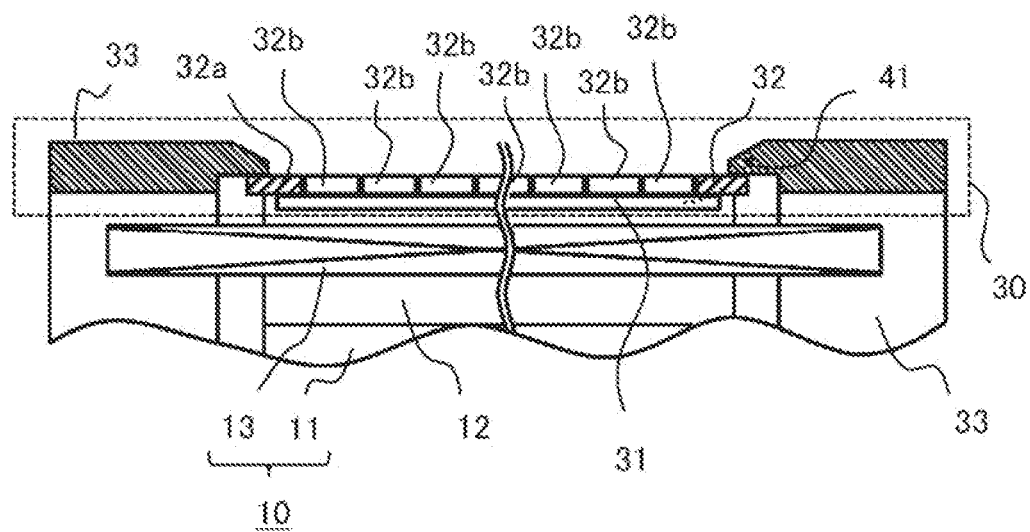
FIG. 28 is a sectional view along G2-G2 in FIG. 24.

FIG. 20 is a diagram showing a first example of arrangement of wedges in a short-circuit generator according to Embodiment 3. FIG. 21 is a sectional view along D1-D1 in FIG. 20, FIG. 22 is a sectional view along D2-D2 in FIG. 20, and FIG. 23 is a sectional view along E-E in FIG. 20. FIG. 24 is a diagram showing a second example of arrangement of wedges in a short-circuit generator according to Embodiment 3. FIG. 25 is a sectional view along F1-F1 in FIG. 24, and FIG. 26 is a sectional view along F2-F2 in FIG. 24. FIG. 27 is a sectional view along G1-G1 in FIG. 24, and FIG. 28 is a sectional view along G2-G2 in FIG. 24. The short-circuit generators 100 of Embodiment 3 each differ from the short-circuit generator 100 of Embodiment 1 as the second example or Embodiment 2 in that the portions of each wedge that are placed at both ends in the axial direction of the rotor 10 are provided as wedges 32a. The short-circuit generator 100 of Embodiment 3 shown in FIG. 20 to FIG. 23, having the arrangement of wedges of the first example, differs from the short-circuit generator 100 of Embodiment 1 as the second example (short-circuit generator 100 of Sample S3) in that the portions of each wedge that are placed at both ends in the axial direction of the rotor 10 are provided as the wedges 32a. The short-circuit generator 100 of Embodiment 3 shown in FIG. 24 to FIG. 28, having the arrangement of wedges of the second example, differs from the short-circuit generator 100 of Embodiment 2 in that the portions of each wedge that are placed at both ends in the axial direction of the rotor 10 are provided as the wedges 32a. Description will be made mainly on differences from the short-circuit generator 100 of Embodiment 1 or Embodiment 2.

At each of the ends in the axial direction of the rotor 10, the induction current 41 flowing in the damper circuit 30 flows into the retaining ring 33 and then flows to the opposite pole in the rotor 10 in a detouring manner. At this time, the current flowing in the wedge 32a placed at the end in the axial direction of the rotor 10 then flows passing through the contact resistance between the wedge 32a and the retaining ring 33 or the contact resistance between the core projection portion 17 in the rotor core 11 and the retaining ring 33. In the short-circuit generators 100 of Embodiment 1 as the second example (see, FIG. 10) and Embodiment 2, the wedges 32*b* that are lower in electric conductivity than the wedges 32*a* are placed in many rotor slots 12 in the rotor 10. The wedge 32*b* has, accordingly, a contact resistance that is larger than that of the wedge 32*a*, so that, in some cases, it locally generates heat to cause electric erosion at its metal contact portion. Thus, with respect to the rotor slot 12 in which the wedge 32*b* is used, when the portions of the wedge placed at both ends in the axial direction of the rotor 10 are substituted with the wedges 32*a*, it is possible to prevent local heat generation at the ends of the wedge in the axial direction, to thereby prevent electric erosion from occurring at the ends of the wedge in the axial direction. Therefore, according to the short-circuit generator 100 of Embodiment 3, since it can prevent electric erosion from occurring at the ends of the wedge in the axial direction of the rotor 10, the reliability of the short-circuit generator 100, namely, the lifetime thereof, is improved.

FIG. 20 is a diagram in which a quarter of the outermost periphery of the rotor 10 having the arrangement of wedges of the first example, is expressed on a two-dimensional surface, namely, a portion of the outermost periphery of the rotor 10 extending from 0° to 90° is expressed on a two-dimensional surface. Note that in FIG. 20, the retaining rings 33 are shown by broken lines. FIG. 24 is a diagram in which a quarter of the outermost periphery of the rotor 10 having the arrangement of wedges of the second example, is expressed on a two-dimensional surface, namely, a portion of the outermost periphery of the rotor 10 extending from 0° to 90° is expressed on a two-dimensional surface. Note that in FIG. 24, the retaining rings 33 are shown by broken lines.

According to the short-circuit generator 100 of Embodiment 3 shown in FIG. 20 to FIG. 23 and having the arrangement of wedges of the first example, an effect is achieved that is similar to that of the short-circuit generator 100 of Embodiment 1, and the reliability of the short-circuit generator 100, namely, the lifetime thereof, is improved. According to the short-circuit generator 100 of Embodiment 3 shown in FIG. 24 to FIG. 28 and having the arrangement of wedges of the second example, an effect is achieved that is similar to that of the short-circuit generator 100 of Embodiment 2, and the reliability of the short-circuit generator 100, namely, the lifetime thereof, is improved.

It should be noted that, in this application, a variety of exemplary embodiments and examples are described; however, every characteristic, configuration or function that is described in one or more embodiments, is not limited to being applied to a specific embodiment, and may be applied singularly or in any of various combinations thereof to another embodiment. Accordingly, an infinite number of modified examples that are not exemplified here are supposed within the technical scope disclosed in the present description. For example, such cases shall be included where at least one configuration element is modified; where at least one configuration element is added or omitted; and furthermore, where at least one configuration element is extracted and combined with a configuration element of another embodiment.

DESCRIPTION OF REFERENCE NUMERALS AND SIGNS

10: rotor, 11: rotor core, 12: rotor slot, 13: field coil (field winding), 15: rotor central axis, 16: magnetic pole, 20: stator, 22: stator coil, 23: stator slot, 31: damper bar, 32, 32*a*, 32*b*: wedge, 100: short-circuit generator, a: slot width, b: slot depth, hw: wedge height, hd1: damper-bar height.

The invention claimed is:

1. A short-circuit generator which comprises a rotor and a stator located around an outer periphery of the rotor so as to enclose a rotor central axis thereof, said stator having stator slots in which windings are placed, and said stator slots each having a depth in a radial direction perpendicular to the rotor central axis whose ratio divided by a width of the stator slot in a direction perpendicular both to the radial direction and a direction of the rotor central axis, is less than three,
    wherein the rotor comprises: a rotor core in which plural magnetic poles and plural rotor slots are formed; a field winding placed in each of the rotor slots; a metallic damper bar placed in each of the rotor slots on an outer periphery side of the field winding; and a metallic wedge placed in each of the rotor slots on an outer periphery side of the damper bar and connected to the damper bar; and
    wherein a damper-bar height that is a height of the damper bar in the radial direction is less than a wedge height that is a height of the wedge in the radial direction, and the rotor includes, each as one of the rotor slots, a rotor slot in which the wedge of a first material is placed, and a rotor slot in which the wedge of a second material that is lower in electric conductivity than the first material is placed.

2. The short-circuit generator of claim 1, wherein the rotor slot in which the wedge of the first material is placed, is located nearest to one of the magnetic poles of the rotor core.

3. The short-circuit generator of claim 2,
    wherein each of these wedges is divided into plural portions;
    wherein the thus-divided wedge is placed in the rotor slot in the direction of the rotor central axis; and
    wherein a portion of the divided wedge placed at its end in the direction of the rotor central axis, is formed of the first material.

4. The short-circuit generator of claim 2,
    wherein each of these wedge is divided into plural portions;
    wherein the thus-divided wedge is placed in the rotor slot in the direction of the rotor central axis; and
    wherein, in the rotor slot in which the wedge of the second material is placed, a portion of the divided wedge placed at its end in the direction of the rotor central axis, is instead formed of the first material.

5. The short-circuit generator of claim 2, wherein the rotor is provided with a metallic retaining ring which covers an end portion of the rotor core in the direction of the rotor central axis and an end portion of the wedge in the direction of the rotor central axis, and which is in contact with the end portion of the rotor core in the direction of the rotor central axis and the end portion of the wedge in the direction of the rotor central axis.

6. The short-circuit generator of claim 2, wherein the first material is BeCu or CrCu.

7. The short-circuit generator of claim 1,
    wherein each of these wedges is divided into plural portions;
    wherein the thus-divided wedge is placed in the rotor slot in the direction of the rotor central axis; and
    wherein a portion of the divided wedge placed at its end in the direction of the rotor central axis, is formed of the first material.

8. The short-circuit generator of claim 7, wherein the rotor is provided with a metallic retaining ring which covers an end portion of the rotor core in the direction of the rotor central axis and an end portion of the wedge in the direction of the rotor central axis, and which is in contact with the end portion of the rotor core in the direction of the rotor central axis and the end portion of the wedge in the direction of the rotor central axis.

9. The short-circuit generator of claim 7, wherein the first material is BeCu or CrCu.

10. The short-circuit generator of claim 1,
wherein each of these wedge is divided into plural portions;
wherein the thus-divided wedge is placed in the rotor slot in the direction of the rotor central axis; and
wherein, in the rotor slot in which the wedge of the second material is placed, a portion of the divided wedge placed at its end in the direction of the rotor central axis, is instead formed of the first material.

11. The short-circuit generator of claim 10, wherein the rotor is provided with a metallic retaining ring which covers an end portion of the rotor core in the direction of the rotor central axis and an end portion of the wedge in the direction of the rotor central axis, and which is in contact with the end portion of the rotor core in the direction of the rotor central axis and the end portion of the wedge in the direction of the rotor central axis.

12. The short-circuit generator of claim 10, wherein the first material is BeCu or CrCu.

13. The short-circuit generator of claim 10, wherein the second material is a stainless steel.

14. The short-circuit generator of claim 1, wherein the rotor is provided with a metallic retaining ring which covers an end portion of the rotor core in the direction of the rotor central axis and an end portion of the wedge in the direction of the rotor central axis, and which is in contact with the end portion of the rotor core in the direction of the rotor central axis and the end portion of the wedge in the direction of the rotor central axis.

15. The short-circuit generator of claim 14, wherein the wedge is formed of BeCu, CrCu or a stainless steel.

16. The short-circuit generator of claim 1, wherein the rotor is provided with a metallic retaining ring which covers an end portion of the rotor core in the direction of the rotor central axis and an end portion of the wedge in the direction of the rotor central axis, and which is in contact with the end portion of the rotor core in the direction of the rotor central axis and the end portion of the wedge in the direction of the rotor central axis.

17. The short-circuit generator of claim 1, wherein the wedge is formed of BeCu, CrCu or a stainless steel.

18. The short-circuit generator of claim 1, wherein the first material is BeCu or CrCu.

19. The short-circuit generator of claim 1, wherein the second material is a stainless steel.

\* \* \* \* \*